3,752,645
WATER SWOLLEN CELLULOSE AND BLENDS DYED WITH INSOLUBLE, NON-VATTABLE ANTHRAQUINONE DYES IN A GLYCOL ETHER SOLUTION
Thomas Michael McGuire, Newark, Del., assignor to E. I. du Pont de Nemours and Company, Wilmington, Del.
No Drawing. Filed July 30, 1971, Ser. No. 167,830
Int. Cl. C09b 5/62; D06p 3/82
U.S. Cl. 8—21 C 10 Claims

ABSTRACT OF THE DISCLOSURE

Water swellable cellulosic fibers, for example, cotton, or blends or mixtures thereof with synthetic fibers, for example, polyester fibers, uniformly dyed to blue to green shades with essentially water insoluble, non-vattable, 1-aroylamino - 5,8 - di(N-substituted)aminoanthraquinone dyes, for example, 1-benzoylamino-5,8-bis(p-toluidino)anthraquinone, said dyed fibers being fast to washing, drycleaning and sublimation and exhibiting a reflectance color value (S') after scour of at least about 2.

BACKGROUND OF THE INVENTION

(1) Field of the invention

This invention relates to uniformly dyed water swellable cellulosic fibers and to dyed mixtures or blends of such water swellable cellulosic fibers and synthetic fibers.

(2) Description of the prior art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

(1) A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.

(2) A water soluble preformed dye having an affinity for the cellulosic material is exhausted onto the material from an aqueous solution by a procedure which involves reducing the solubility of the dye in the aqueous solution, as with direct dyes.

(3) A dye containing a substituent which reacts with the cellulose or a modified cellulose is exhausted onto the material from either an aqueous or non-aqueous solution under conditions such that the dye is chemically bonded to the substrate, as with fiber reactive dyes.

(4) Water insoluble pigments are bonded to the cellulose with polymeric materials, as in pigment printing.

(5) A finely divided form of a water insoluble dye is incorporated into the cellulose during a manufacturing step, as is sometimes done during spinning of viscose rayon.

None of those conventional procedures can be used to dye water swellable cellulose by directly introducing into the material a preformed, nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pats. 396,692 and 2,069,215 and British Pat. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Generally, complex two-stage processes are required and the components of the blend or mixture are dyed in separate steps with different dyes. Cross-staining may result and the amounts of dyes required usually are high, with each component undesirably interfering with the dyeing of the other. When cross-staining occurs, the dye must be capable of being scoured off the stained component. Even under optimum conditions, however, shade match on both components of the blend is difficult to achieve. The complexity of the two-stage process for dyeing blends also is apparent from a consideration of the divergency of operating conditions between conventional dyeing processes for water swellable cellulosic materials and synthetic materials. In contrast to the aforesaid procedures for dyeing water swellable cellulose, the usual procedures for dyeing synthetic materials are based on dissolution of water insoluble dyes in the synthetic material.

Representative of prior art on the dyeing of blends of such cellulosic and synthetic materials employing a two-stage process is U.S. Pat. 3,313,590. Analogous to the dyeing of such blends and confirming the aforesaid distinction between water swellable cellulosic materials and non-water swellable cellulose acetate, U.S. Pat. 3,153,563 discloses a two-stage process wherein the cellulose acetate is dyed with a water insoluble dye without coloring the cellulose which then is dyed in an independent step.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in Textile Research Journal, 32, 331–337 (1962) report that cotton can be swollen with water containing both high boiling, water soluble, non-reactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. 2,339,913 issued Jan. 25, 1944 to Hanford and Holmes. The cellulosic is swollen with water, the water then is replaced with methanol-benzene and finally with benzene, with retention of swelling. A cellulose-reactive material (crosslinking agent) is added as a benzene solution and crosslinking is effected.

Blackwell, Gumprecht and Starn in Canadian Pat. 832,343 disclose a process for dyeing water swellable cellulosic materials with preformed disperse dyes, that is, dyes which do not require an in situ chemical reaction, such as oxidation or reduction, for development of color on the substrate, such as a fabric, which process comprises contacting the water swellable cellulosic material in any sequence with the following:

(1) Water in an amount sufficient to swell the cellulose;

(2) A preformed dye in an amount sufficient to color the cellulose, a boiling saturated solution of which dye in 0.1 molar aqueous sodium carbonate exhibits an optical absorbance not in excess of about 30; and (3) A solvent in an amount sufficient to maintain swelling of the cellulose if water is removed, and which (a) is at least 2.5 weight percent soluble in water at 25° C.,
(b) boils above about 150° C. at atmospheric pressure,
(c) is a solvent for the dye at some temperature in the range of about 0° to 225° C., and
(d) has the formula

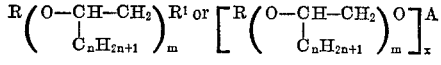

wherein $n$ is 0 or 1;

$m$ is a positive whole number;

R is H, $C_{1-8}$ alkyl, $C_{7-15}$ aralkyl or alkaryl,

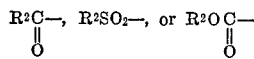

wherein $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;

$R^1$ is —OH, —$OR^2$, —$SR^2$, —$NRH^2$, —$NR^2$ ($C_{1-8}$ alkyl), —$NR^2$($C_{7-15}$ aralkyl or alkaryl),

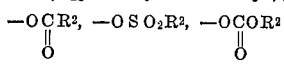

—NH(phenyl), or —NH(naphthyl), wherein $R^2$ is as defined above;

$x$ is the number of unsatisfied valencies in A; and

A is $ROCH_2CHORCH_2$—, —$CH_2CHORCH_2$—,

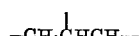

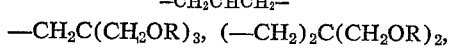

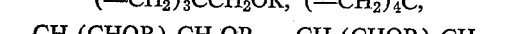

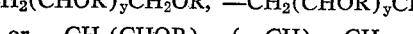

in which $y$ is 2, 3 or 4; $z$ is 0, 1, 2, 3 or 4 but no greater than $y$; and R is as defined above;

provided that at some stage during the process the interior of the swollen cellulose is contacted with a solution of the preformed dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

British Pat. 1,147,110 discloses sulfonated, water soluble, fiber reactive anthraquinone dyes. Page 6 of said patent broadly discloses a method for preparing intermediates for such fiber reactive dyes, which intermediates include compounds having the formula

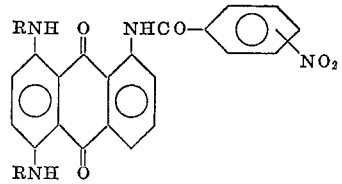

wherein R is aryl.

OBJECTS AND SUMMARY OF THE INVENTION

It is an object of the present invention to provide uniformly dyed fibers. A further object is to provide uniformly dyed water swellable cellulosic fibers and uniformly dyed blends or mixtures of water swellable cellulosic fibers and synthetic fibers. Still another object is to provide uniformly dyed blue to green fibers which are fast to washing, drycleaning and sublimation and which exhibit a reflectance color value (S') after scour of at least about 2. Another object is to provide water swellable cellulosic fibers which have been dyed with essentially water insoluble, non-vattable anthraquinone dyes.

The present invention resides in uniformly dyed blue to green water swellable cellulosic fibers or blends or mixtures of water swellable cellulosic fibers and synthetic fibers, said dyed fibers being fast to washing, drycleaning and sublimation and exhibiting a reflectance color value (S') of at least about 2 after one thorough scour in aqueous detergent at 90°–100° C. and one thorough scour in perchloroethylene at 50° C., wherein said dyed fibers the dye comprises the anthraquinone dye having the formula

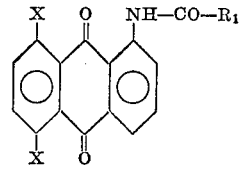

wherein $R_1$ is $C_{1-18}$ alkyl, naphthyl, phenyl or phenyl substituted with $C_{1-4}$ alkyl, $C_{1-4}$ alkoxy, Cl, Br, $CF_3$ or $NO_2$, and X contains 6–18 carbon atoms and is NHalkyl, NHcyclohexyl, N(alkyl)$_2$ or $NHR_2$ wherein $R_2$ is

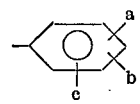

wherein $a$ is H, alkyl or alkoxy, $b$ is H, alkyl, alkoxy, F, Cl, Br, NHCOalkyl or NHCOR, and $c$ is H, alkyl, alkoxy, F, Cl, Br, NHCOalkyl, NHCOR, R, OR, NHR, $CF_3$, CN, $CONH_2$, CONHalkyl, CON(alkyl)$_2$, CONHR, CON(alkyl)R, $SO_2NH_2$, $SO_2NH$alkyl, $SO_2NHR$, $SO_2N$(alkyl)$_2$, $SO_2N$(alkyl)R, COalkyl, COR, $CO_2$alkyl, $CO_2R$, $SO_2$alkyl, $SO_2R$ or N=NR, wherein R is phenyl or phenyl substituted with alkyl, alkoxy, halogen, $CF_2$ or $NO_2$, provided that the 6-position of $R_2$ is substituted with H, or if the 2-position is substituted with Br or alkyl of greater than two carbon atoms, then H or Br, or if the 2-position is substituted with $C_{1-2}$ alkyl, then H, Br or $C_{1-2}$ alkyl.

DETAILED DESCRIPTION OF THE INVENTION

The aforesaid anthraquinone dyes which are used in the preparation of the dyed fibers of this invention are prepared by conventional processes and techniques. As an example of such processes and techniques, an aliphatic amine, such as listed in Table 1, or an aromatic amine, such as listed in Table 2, can be condensed with 5-aminoquinizarin or 1,4,5-triaminoanthraquinone. Both are prior are known compounds. The reaction is carried out by reducing either of the aforementioned anthraquinone derivatives wholly or partially to the leuco form in known fashion and heating the resulting material with at least two moles of the amine in a suitable solvent. With aryl amines, the reaction is carried out in the presence of boric acid. Suitable solvents include chlorobenzene, Cellosolve, 1-pentanol and an excess of the amine itself. Zinc and hydrochloric acid can be used as the reducing agent by adding these materials directly to the reaction mixture. Alkyl amines can be condensed with 5-aminoquinizarin or 1,4,5-triaminoanthraquinone in aqueous alcoholic media in the presence of sodium carbonate or sodium hydroxide. Sodium hydrosulfite can be used as the reducing agent in these systems. The leuco form of the product is then oxidized in each case by prolonged heating of the reaction mixture in air, advantageously in the presence of an aromatic nitro compound.

TABLE 1

| | |
|---|---|
| n-Hexylamine | Di-n-hexylamine |
| n-Dodecylamine | Di-n-nonylamine |
| n-Octadecylamine | Cyclohexylamine |
| Di-n-propylamine | 4-n-octylcyclohexylamine |

TABLE 2

| | |
|---|---|
| Aniline | 2,3-,2,4-, 2,5- or 3,5-dichloroaniline |
| o-, m- or p-Toluidine | 2-chloro-5-trifluoromethylaniline |
| o-, m- or p-Ethylaniline | 2-chloro-4-methylaniline |
| p-n-Butylaniline | 2-chloro-5-methylaniline |
| p-n-Octylaniline | 3-chloro-2-methylaniline |
| p-n-Dodecylaniline | 3-chloro-4-methylaniline |
| o-, m- or p-Anisidine | 4-chloro-2-2-methylaniline |
| o-, m- or p-Phenetidine | 5-chloro-2-methylaniline |
| p-Butoxyaniline | 2-chloro-5-methoxyaniline |
| 2,3-, 2,4-, 2,5-, 3,4- or 3,5-xylidine | 5-chloro-2-methoxyaniline |
| 2,4-, 2,5- or 3,5-dimethoxyaniline | 4-fluoro-2-methylaniline |
| 3,4-diethoxyaniline | 5-fluoro-2-methylaniline |
| Cresidine | 4-chloro-2,5-dimethoxyaniline |
| 3-isopropyl-4-anisidine | p-Aminoacetophenone |
| o-, m- or p-Fluoroaniline | p-Octylsulfonylaniline |
| o-, m- or p-Chloroaniline | m-Aminobenzoic acid, propyl ester |
| o-, m- or p-Bromoaniline | |
| 5-chloro-2,4-dimethoxyaniline | p-Amiobenzophenone |
| p-Aminoacetanilide | 4-amino-3-bromobenzophenone |
| p-Aminododecanoylanilide | 4-amino-4'-nitrobenzophenone |
| 4'-aminobenzanilide | p-Aminobenzoic acid, p-chlorophenyl ester |
| 3'-amio-4-t.-butylbenzanilide | |
| p-Aminobiphenyl | 4-(p-butoxyphenylsulfonyl)-3-ethylaniline |
| m-Phenoxyaniline | |
| p-Phenoxyaniline | 2,5-dimethoxy-4-(phenylsulfonyl)-aniline |
| m-Cyanoaniline | |
| 3-amino-5-chlorobenzamide | p-(Phenylazo)aniline |
| Anthranilic acid, N,N-octylamide | 4-(p-nitrophenylazo)-2-methoxy-5-methylaniline |
| p-Aminobenzoic acid, N,N-diethylamide | |
| | 2-toluidine-4-(N-butylsulfonamide) |
| 5-amino-2-chlorobenzanilide | |
| p-Aminobenzoic acid, N-methylanilide | 2-anisidine-5-(N,N-dimethylsulfonamide) |
| p-Aminobenz(p-n-hexylanilide) | Sulfanil-(p-anisidide) |
| Orthanilamide | Metanil-(N-butylanilide) |
| m-Aminobenzotrifluoride | |

The 1-amino-5,8-di(substituted amino)anthraquinone, prepared as described above, can then be condensed by known procedures with an acid chloride, such as listed in Table 3, to give the desired dye.

TABLE 3

| | |
|---|---|
| Acetyl chloride | o-, m- or p-Anisyl chloride |
| Caproyl chloride | o-, m- or p-Chlorobenzoyl chloride |
| Decanoyl chloride | m- or p-Nitrobenzoyl chloride |
| Stearyl chloride | o-, m- or p-Trifluoromethylbenzoyl chloride |
| 1- or 2-naphthoyl chloride | |
| Benzoyl chloride | o-, m- or p-Toluoyl chloride |
| p-t.-Butylbenzoyl chloride | o-, m- or p-Bromobenzoyl chloride |
| p-n-Butoxybenzoyl chloride | |

A second route to the dyes employed in this invention involves the reaction between an aromatic amine, such as given in Table 2, and a 1-acylamino-5,8-dihaloanthraquinone. Aliphatic amines do not readily undergo biscondensation with these materials. The haloanthraquinone can be the chloro or bromo derivative, but the chloro compound is preferred for economic reasons. The reaction is carried out by heating the reactants together in a suitable solvent, such as nitrobenzene, o-dichlorobenzene or an excess of the amine itself. It is advantageous to have an inorganic acid acceptor present, such as an alkali metal acetate, carbonate or a mixture thereof. Copper, a copper salt or a mixture thereof can also be added to promote the reaction.

The 1 - acylamino-5,8-dichloroanthraquinones can be obtained by acylating 1-amino-5,8-dichloroanthraquinone in known fashion with an acid chloride, such as given in Table 3. Alternatively, acylation of the 1-amino group can follow the biscondensation reaction with the aromatic amine.

1-amino-5,8-dichloroanthraquinone can be obtained by treating 1-aminoanthraquinone with chlorine in concentrated or fuming sulfuric acid in the presence of a catalyst such as iodine. Such a process is well known in the prior art. Chlorine is passed through the reaction mixture at about 25–80° C. until the amount of the desired product is at a maximum as shown, for example, by thin layer or vapor phase chromatography. The chlorinated product usually contains, in addition to the desired product, small amounts of unreacted starting material, mono- and trichlorinated compounds, as well as other dichloroisomers Purification of the 1-amino-5,8-dichloroanthraquinone is best carried out after reaction with the acid chloride, by recrystallization from a suitable solvent such as o-dichlorobenzene. The trichlorinated material 1-acylamino-4,5,8-trichloroanthraquinone is the most difficult to remove. However, it has been found that minor amounts of this material, up to about 30 weight percent, in the 1-acylamino-5,8-dichloroanthraquinone provide a mixture of dyes upon reaction with the amine, as described above, the properties of which mixture are comparable to those of the dye obtained from the pure dichloro intermediate. In certain cases it has been found that the dye mixture exhibits a crockfastness, when applied to cellulose-polyester blend fabrics by the process of Blackwell et al., which is superior to that obtained when the pure dye is employed. There is, of course, an obvious economic advantage in not having to effect a separation of the dichloro and trichloro intermediates prior to the dye forming step.

Dyes prepared from the aliphatic amines of Table 1 are greenish blue in shade. Those made from the aromatic amines of Table 2, except for the monoazo amines, are green. Monoazo amines produce yellowish green shades.

Blue dyes employed in this invention can be obtained by the bromination of dyes prepared by the procedures outlined above and derived from certain 2-alkyl-, 4-alkyl-, or 2,4-dialkylanilines. By such means, for example, can be obtained dyes having the formula given above wherein X is NHR$_2$ and R$_2$ is

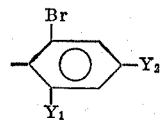

wherein $Y_1$ is Br or $C_{1-2}$ alkyl and $Y_2$ is Br or $C_{1-10}$ alkyl, except that $Y_1$ and $Y_2$ are not both Br. Such blue dyes may also contain a minor proportion of the 4,5,8-tri(NHR$_2$)substituted dye if the unbrominated dye is made from 1-amino-5,8-dichloroanthraquinone with its attendant impurity of 1-amino-4,5,8-trichloroanthraquinone. Bromination is carried out by adding bromine to a solution or suspension of the intermediate green dye in a suitable organic solvent, such as nitrobenzene or chlorobenzene, and heating the reaction mixture. Such a procedure is well known in the prior art.

Greenish blue dyes of the formula given above wherein X is NHR₂ and R₂ is

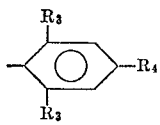

wherein R₃ is $C_{1-2}$ alkyl and R₄ is $C_{1-2}$ alkyl or H can be obtained by condensing 1,4-diamino-5-nitroanthraquinone with a bromophenyl derivative such as 1-bromo-2,4,6-trimethylbenzene, 1-bromo - 2,4,6 - triethylbenzene, 2-bromo-1,3-dimethylbenzene or 2-bromo-1-ethyl-3,5-dimethylbenzene. This is carried out as described in the prior art, for example, by heating the reactants together in an inert organic solvent in the presence of an acid binding agent, such as an alkali metal carbonate or acetate. Copper or a salt thereof also can be added to accelerate the reaction. The resulting 1,4-bis(alkylanilino)-5-nitroanthraquinone then can be reduced by known procedures to the 5-amino derivative and treated with an acid chloride to give the desired dye.

The cellulosic materials which can be dyed with the dyes employed in this invention by the previously described Blackwell et al. process include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. To facilitate dyeing, such fabrics can be pretreated with 10% aqueous caustic or the dyeing can be carried out in the presence of wetting agents, preferably of the nonionic type. Mixtures of cotton and rayon fibers can be dyed, and the dyes employed herein also can be used to dye purified wood pulp and paper. Excluded as the water swellable cellulosic material, as considered herein, is cellulose acetate which does not exhibit the requisite swellability in the presence of water.

The synthetic materials which can be dyed with the dyes employed in this invention include polyesters, polyamides, cellulose ethers and esters, and copolymers and mixtures thereof with other components intended to make them more easily dyeable or to add other desirable properties. Many of the aforesaid dyes can be applied to synthetic materials by a conventional Thermosol dyeing procedure.

The dyes employed in this invention can be applied to water swellable cellulosic materials, or to blends or mixtures thereof with synthetic materials, by the above-described Blackwell et al. process. The dyes employed in this invention are particularly useful for dyeing mixtures and blends of cotton and polyester or polyamide, such as mixtures containing 50 to 80% polyethylene terephthalate and 20 to 50% cotton. In such mixtures, the synthetic material is dyed using conventional process conditions. Since the aforesaid dyes can be used to dye both components in a blend or mixture, scourability as a factor in dye selection is avoided since the previously described cross-staining problem has been minimized.

The dyes employed in this invention dye the substrate directly, that is, they do not require oxidation, reduction, hydrolysis, or any other chemical modification for development of color or fastness. The dyes exhibit excellent fastness to washing, drycleaning and sublimation and good (fair to excellent) fastness to light.

In dyeing cellulosic materials with the aforesaid dyes using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabzric is dyed. Alternatively, water is evaporated, but in an insufficient amount to effect dissolution of the dye, after which pressure and heat are applied to effect dissolution without further evaporation of water. Dye pastes can be prepared by conventional techniques such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dyebaths. Such additives frequently include migration inhibitors such as purified vegetable gums and wetting agents, examples of which are ionic and nonionic surfactants such as ethylene oxide condensation products, hydrocarbon sulfonates and long-chain alcohol sulfates. Dyebath used in practicing this invention also can contain dyes other than those employed in this invention; for example, direct dyes or fiber reactive dyes for cotton or for polyamides can be present for shading purposes.

In the preferred dyeing procedure with the dyes employed in this invention, an aqueous dye dispersion and the organic solvent are applied to the fabric from a single padbath. The amount of water in the padbath usually is 70–95 weight percent and the solvent, 5–30 weight percent. The padded fabric is heated at 180–225° C. for 30–180 seconds. For cotton, temperatures as low as 150° C. usually are adequate. The dyed fabric generally is given an aqueous scour, or an aqueous scour followed by a perchloroethylene scour, to ensure complete removal of surface dye.

The dyes employed in this invention and which cannot be obtained as aqueous dispersions can be employed as solutions in the hot solvent. Alternatively, the dye can be employed as a solution in a low boiling auxiliary solvent, as defined by Blackwell et al., such as a halogenated hydrocarbon boiling below about 130° C.

The dyes used in the present invention cannot be applied to cotton as vat dyes. At best, a vatting procedure produces a light surface stain on the cotton fibers which is completely removed by a perchloroethylene scour.

The minimum shade depth of a dyed water swellable cellulosic material that is within this invention is defined as having a reflectance color value (S') of at least 2 (using a modification of the reflectance color value S given in British Patent 1,056,358) after the dyed fabric has been scoured in aqueous detergent at 90–100° C. and then in perchloroethylene at 50° C.

The reflectance color value is given by the equation $$S=(L+M+N)$$

where L, M and N replace the well known standard colorimetric values X, Y and Z set up by the CIE (Commission Internationale d'Eclairage). Whereas $$X, Y, Z = \int R_\lambda E_\lambda(\tilde{x}, \tilde{y}, \tilde{z}) d\lambda \quad (i)$$

(where $R_\lambda$=reflectance characteristic of the wavelength; $E_\lambda$=radiation function of the illuminant, and $\tilde{x}, \tilde{y},$ and $\tilde{z}$=CIE distribution coefficients which characterize a particular color), $$L, M, N = \frac{1}{K_0} \int F_\lambda E_\lambda(\tilde{x}, \tilde{y}, \tilde{z}) d\lambda \quad (ii)$$

(where $K_0$=dyestuff concentration and
$F_\lambda = \frac{(1-R_\lambda)^2}{2(1-r)(R_\lambda - r)}$ where $R_\lambda$ is defined above and $r$= residual surface reflectance of the substrate when dyed completely black).

The sum of $(L+M+N)$, as the terms are defined in Equation ii, is a constant for a given dye and independent of the concentration of dye on the substrate. In order to obtain values for $(L+M+N)$ which are proportional to the shade depth of the dyed fabric, the concentration term $1/K_0$ has been removed from Equation ii; since it is desirable to obtain numbers in the 0–25 range, the values of the summation $(L+M+N)$ have been further modified by dividing by 100. This new summation, as used herein and represented by S', is related to S as defined in British Patent 1,056,358 by the equation $$S' = \frac{K_0}{100} \times S$$

where $K_0$ is as defined above.

A reflectance color value (S') of 2 represents a light but useful shade, that is, a dyeing rather than a mere staining of the fibers. It has been found that such shade depths are easily obtained on cotton with the dyes described herein and, by increasing the concentration of dye in the padbath, shade depths of several times this figure can be achieved readily.

The following demonstrates the advantage of using the dyes employed in the invention in the Blackwell et al. process, as opposed to conventional vatting procedures, in the dyeing of cotton. A piece of cotton poplin was padded with an aqueous bath containing 50 grams per liter of a 15% aqueous dispersion of the dye of Experiment 1(A). Pickup was 50–60%. The fabric was dried and then padded with an aqueous solution containing caustic soda (45 grams per liter) and sodium hydrosulfite (45 grams per liter). The cloth was steamed for 30 seconds at 104° C. and rinsed. The cotton was then treated for 10 minutes in an aqueous solution of sodium perborate (25 grams per liter) at 49° C. Next, the material was soaped for 5 minutes at 93° C. in a 2% oleate soap solution, rinsed thoroughly and dried. Finally, the green tinted material was scoured in perchloroethylene at 50° C. for 5 minutes. Almost all of the color was removed from the fabric. In contrast to this as shown below in Example 1, green shades, fast to the perchloroethylene scour, were produced when the dye was applied by the Blackwell et al. process.

The following demonstrates the non-utility of dyes which are structurally similar to the dyes employed in the present invention. The dye 1-(p-toluenesulfonamido)-5,8-bis(p-toluidino)antharaquinone was prepared by the procedure of Experiment 1(A) except that pyridine was added as the acid acceptor and p-toluenesulfonyl chloride was employed as the acid chloride. The dye was applied to cotton broadcloth and to 65/35 "Dacron" polyester/cotton blend fabric by the procedure of Example 1. Green shades were produced of good fastness to light and sublimation. However, washfastness was poor unless the dyed fabric was first given a permanent press resin finish.

The following experiments illustrate typical preparative procedures for the dyes employed in this invention. Parts are given by weight unless otherwise indicated.

EXPERIMENT 1

(A) A mixture of 29.2 parts of 1-amino-5,8-dichloroanthraquinone containing a minor amount of 1-amino-4,5,8-trichloroanthraquinone, 260 parts of o-dichlorobenzene and 22.3 parts of p-nitrobenzyl chloride was stirred under a nitrogen sweep at 140° C. for 2 hours and then allowed to cool to room temperature. The solids were isolated by filtration, washed successively with methanol, hot water, 10% aqueous sodium carbonate solution, hot water (until free of alkali) and finally with methanol, and dried. Yield of 1-(p-nitrobenzamido)-5,8-dichloroanthraquinone: 23.3 parts; M.P 286–298° C.

Any of the acid chlorides in Table 3 can be reacted with 1-amino-5,8-dichloroanthraquinone by procedures similar to the above to produce the corresponding 1-aroylamino-5,8-dichloroanthraquinone.

A mixture of 218 parts of the aforesaid 1-(p-nitrobenzamido)-5,8-dichloroanthraquinone, 214 parts of p-toluidine, 98.4 parts of anhydrous sodium acetate, 127.2 parts of anhydrous sodium carbonate and 2,000 parts of nitrobenzene was stirred at 190° C. for 20 hours. The charge was allowed to cool to 90° C., whereupon 800 parts of ethanol was added. The mass was allowed to cool to room temperature with stirring and the solids were isolated by filtration. After washing several times with methanol and then with hot water, the solids were reslurried in dilute sulfuric acid and isolated by filtration. The dye was washed with hot water, until the washings were neutral, and then dried. Yield: 248 parts; M.P. 262–265° C. An absorption spectrum of the dye in the visible region exhibited a shoulder at 625 m$\mu$ ($a_{max.}$=26.8 liters gm.$^{-1}$ cm.$^{-1}$) and a peak at 665 m$\mu$ ($a$=$_{max.}$=30.6 liters gm.$^{-1}$ cm.$^{-1}$). Thin layer chromatography indicated the presence of a minor amount (10–15%) of a yellowish green component in the green product. Based on the above, the main component is 1-(p-nitrobenzamido)-5,8-bis(p-toluidino)-anthraquinone. The minor component was shown to be 1-(p-nitrobenzamido)-4,5,8-tris(p-toluidino)anthraquinone by chromatographic comparison with an authentic sample thereof.

(B) A sample of the dye mixture from (A) was recrystallized from chloroform. Thin layer chromatography indicated the removal of much of the 1-(p-nitrobenzamido)-4,5,8-tris(p - toluidino)anthraquinone from the mixture, leaving a significantly purer sample of 1-(p-nitrobenzamido)-5,8-bis(p-toluidino)anthraquinone, M.P. 290–291° C. The dye exhibited absorptivities of 31.3 liters gm.$^{-1}$cm.$^{-1}$ at 625 m$\mu$ (shoulder) and 35.5 liters gm.$^{-1}$cm.$^{-1}$ at 664 m$\mu$ (peak).

EXPERIMENT 2

A mixture of 5 parts of 1-(p-nitrobenzamido)-5,8-dichloroanthraquinone, 36 parts of m-chloroaniline, 2.46 parts of anhydrous sodium acetate and 3.18 parts of anhydrous sodium carbonate was stirred at 190–195° C. under a nitrogen flow for 25 hours. The charge was cooled to 80° C. and 25 parts of ethanol were added. After allowing the reaction mixture to cool to room temperature, the solids were isolated by filtration and washed with ethanol and then with water. The solids were then reslurried in dilute sulfuric acid, stirred at 80° C. for 1 hour, isolated by filtration, washed successively with water (until free of acid) and finally with ethanol, and dried. Yield: 5.5 parts. Thin layer chromatography indicated a minor amount of a yellowish green impurity in the bluish green product. The impurity was shown by chromatographic comparison with an authentic sample to be 1-(p-nitrobenzamido) - 4,5,8 - tris(m-chloroanilino)anthraquinone. Traces of other impurities were removed by extraction with boiling chloroform. The purified dye mixture had a M.P. of 312–316° C. and exhibited absorptivities of 21.1 liters gm.$^{-1}$cm.$^{-1}$ at 612 m$\mu$ (shoulder) and 24.0 liters gm.$^{-1}$cm.$^{-1}$ at 655 m$\mu$ (peak). Based on the above procedure and the chromatographic evidence, the mixture consists of about 85% of 1-(p-nitrobenzamido)-5,8-bis(m-chloroanilino)anthraquinone and about 15% of 1-(p-nitrobenzamido) - 4,5,8 - tris(m-chloroanilino)anthraquinone.

EXPERIMENT 3

Zinc dust (8.91 parts) was added slowly to a mixture of 34 parts of 1,4,5-triaminoanthraquinone, 435 parts of p-n-butylaniline, 38.2 parts of boric acid and 48.5 parts of concentrated hydrochloric acid, which mixture was being stirred under nitrogen at 75° C. The reaction mixture was then heated to 120° C. with stirring for 4 hours, after which it was allowed to cool to below 100° C. Next, 61.2 parts of pulverized potassium hydroxide were slowly added and the reaction mass was allowed to cool to 65° C. After adding 135 parts of methanol, the mixture was stirred overnight and the solids were isolated by filtration, washed with methanol and then with hot water, until the washings were neutral, and dried. Yield of 1,4-bis(p-n-butylanilino)-5-aminoanthraquinone: 46.5 parts; M.P. 125–131° C. Thin layer chromatography (using as eluent a 1:19 mixture of acetonitrile and benzene) indicated the green product was almost free of colored impurities.

A mixture of 45 parts of the above anilinoanthraquinone and 180 parts of nitrobenzene was heated under a nitrogen purge at 120° C. with stirring for 30 minutes to remove traces of water from the charge. Next, 16.3 parts of p-nitrobenzoyl chloride were added slowly and the mixture was stirred for 1 hour at 120° C. After cooling the reaction mass to about 90° C., 120 parts of ethanol were added and the mixture was allowed to cool with stirring overnight. The solids were isolated by filtration, washed with methanol, and then with hot water and finally with methanol, and dried. The green dye product melted at 143–146° C. and exhibited absorptivities of 28.5 liters gm.$^{-1}$cm.$^{-1}$ at 624 m$\mu$ (shoulder) and 32.2 liters gm.$^{-1}$cm.$^{-1}$ at 663 m$\mu$ (peak). Thin layer chromatography (acetonitrile:benzene=1:19) showed the dye to be in a high state of purity. Based on the above, the dye is 1-(p-nitrobenzamido)-5,8-bis(p-n-butylanilino)anthraquinone.

EXPERIMENT 4

The first part of Experiment 3 was repeated, except that the 435 parts of p-n-butylaniline were replaced by 330 parts of mixed xylidines. The yield of product was 41.3 parts; M.P. 154–160° C.

The second part of Experiment 3 was repeated, except that the 45 parts of the anilinoanthraquinone intermediate were replaced by 40 parts of the above xylidinoanthraquinone intermediate. The resulting chromatographically pure green dye (43.5 parts) had a M.P. of 204–207° C. and exhibited absorptivities of 29.3 liters gm.$^{-1}$cm.$^{-1}$ at 620 m$\mu$ (shoulder) and 33.4 liters gm.$^{-1}$cm.$^{-1}$ at 655 m$\mu$ (peak). Based on the above, the dye is 1-(p-nitrobenzamido)-5,8-bis(xylidino)anthraquinone.

EXPERIMENT 5

A mixture of 25.5 parts of 5-aminoquinizarin, 4 parts of caustic soda, 120 parts of isopropanol and 50 parts of water was heated to the reflux temperature under nitrogen. Next 17.4 parts of sodium hydrosulfite were added and the reaction mixture was stirred at reflux for ½ hour, after which 99.2 parts of cyclohexylamine were added and the mixture was stirred at the boil for 19 hours. The nitrogen purge was discontinued and the charge was treated with 2.25 parts of sodium m-nitrobenzene-sulfonate and stirred in air at the reflux temperature for 1 hour. After the charge had cooled to room temperature, the solids were isolated by filtration, washed successively with isopropanol, hot water, until the washings were neutral, and isopropanol, and dried. Yield of 1,4-bis(cyclohexylamino)-5-aminoanthraquinone: 34.0 parts; M.P. 215–218° C. Thin layer chromatography indicated small amounts of colored impurities in the blue product.

A solution of 4.46 parts of p-nitrobenzoyl chloride in 40 parts of nitrobenzene was added in portions to a mixture of 8 parts of the above 1,4-bis(cyclohexylamino)-5-aminoanthraquinone in 60 parts of nitrobenzene which was being stirred under nitrogen at 100° C. After stirring for 1 hour, the reaction mixture was cooled to 80° C. and treated with 32 parts of ethanol. After the reaction mass had cooled to room temperature, the solids were isolated by filtration, washed with isopropanol and then with hot water, until the washings were neutral, and dried. Yield: 7.5 parts; M.P. 248–253° C. After recrystallization from chloroform/isopropanol, the chromatographically pure, greenish blue dye had a M.P. of 260–262° C. and exhibited absorptivities of 37.4 liters gm.$^{-1}$cm.$^{-1}$ at 608 m$\mu$ and 51.3 liters gm.$^{-1}$cm.$^{-1}$ at 658 m$\mu$. Based on the above, the dye is 1-(p-nitrobenzamido)-5,8-bis(cyclohexylamino)anthraquinone.

EXPERIMENTS 6–9

Additional green dyes employed in this invention were prepared by procedures analogous to those described in Experiment 1(A). In each case, benzoyl chloride was employed in place of p-nitrobenzoyl chloride so as to yield 1-benzamido-5,8-diarylaminoanthraquinones. The following table shows the properties of the dyes produced. In the table, X represents the 5- and 8-substituents. In ecah experiment, the crude dye product contained 10–15% of the 4,5,8-tris(X)substituted compound. The minor component was removed by recrystallizing the crude product as described in Experiment 1(B). The amount of the minor component was judged by thin layer chromatography and in each case its structure was verified by chromatographic comparison with an authentic sample of the 4,5,8-triarylaminoanthraquinone. The contaminants were found to be yellower and tinctorially weaker than the main product.

TABLE 4

| Experiment | X | M.P. (° C.) | $\lambda_{max.}$ (m$\mu$) | $a_{max.}$ (liters gm.$^{-1}$ cm.$^{-1}$) |
|---|---|---|---|---|
| 6 | Anilino | 145–152 | [1] 625, 660 | [1] 30.3, 34.7 |
| 7 | p-Toluidino | 265–267 | [1] 625, 663 | [1] 33.3, 37.2 |
| 8 | p-Anisidino | 221–232 | [1] 630, 667 | [1] 28.0, 33.5 |
| 9 | m-Chloroanilino | 248–252 | [1] 613, 653 | [1] 28.9, 32.0 |

[1] Shoulder.

EXPERIMENT 10

A procedure analogous to that described in Experiment 3 was used to prepare 1-benzamido-5,8-bis(cyclohexylamino)anthraquinone. The pure greenish blue dye exhibited the same melting point and spectral characteristics as the dye of Experiment 5.

EXPERIMENT 11

A procedure analogous to that described in Experiment 3 was used to prepare 1-(p-chlorobenzamido)-5,8-bis(p-toluidino)-anthraquinone. The pure green dye had a M.P. of 276–278° C. and exhibited absorptivities of 32.1 liters gm.$^{-1}$ cm.$^{-1}$ at 620 m$\mu$ (shoulder) and 36.3 liters gm.$^{-1}$ cm.$^{-1}$ at 661 m$\mu$ (peak).

The following examples illustrate the preparation of the dyed fibers of this invention. When the green dyes of Experiments 1–4 and the greenish blue dye of Experiment 5 were used to dye cotton or polyester/cotton blend fabrics by the procedures of Examples 1 and 2, excellent light, wash and sublimation fastness were achieved. The fastness to crocking with the dye of Experiment 1(B) was slightly inferior to that with the dye of Experiment 1(A). Similarly, the green dyes of Experiments 6–9 and 11 and the greenish blue dye of Experiment 10 provided excellent fastness to washing, drycleaning and sublimation and fair to good fastness to light.

EXAMPLE 1

Dyeing 65/35 "Dacron" polyester/cotton blend fabric (A) A padbath was prepared from:

| | Grams |
|---|---|
| An aqueous green dye paste (15% active ingredient) containing the dye of Experiment 1(A) | 50 |
| Purified vegetable gum thickener | 20 |
| Methoxypolyethylene glycol (molecular weight 550) | 56.2 |
| Butyl Carbitol | 18.7 |
| Boric acid | 3.6 |
| Water, to 1 liter. | |

A continuous length of 65/35 "Dacron" polyester/cotton fabric was padded at 60% uptake, based on the weight of the fiber, and the padded fabric was passed at a rate of 2 yards per minute between two 1,000-watt infrared lamps (Fostoria-Fannon, Inc., Infrared Heater Model 6624), with each lamp shining on opposite surfaces of the fabric from a distance of about 3 inches. The continuously-moving fabric was passed through a circulating air oven at 80–100° C., with a hold-up time of one minute, and then through an oven at 200–210° C. with a hold-up time of 1.7 minutes. The hot dry fabric was cooled to room temperature and rinsed for one minute each in sequence: in water at 20–30° C., in water at 90–95° C., at 90–95° C. in water containing 1% of an ether-alcohol sulfate detergent, in water at 90–95° C., and in water at 20–30° C. The material was dried, then scoured for 5 minutes in perchloroethylene at 50° C., and dried again. The fabric was uniformly colored (deep green) in a satisfactory union dyeing of the cotton and "Dacron" fibers.

(B) Part A was repeated except that the heating was carried out as follows. The padded fabric was passed at a rate of 2 yards per minute between banks of infrared lamps, with one 1,000 watt lamp (Fostoria-Fannon, Inc., Infrared Heater Model 6624) shining on each surface perpendicular to the fabric from a distance of about 3 inches. The moist fabric was then passed over a series of four revolving smooth-surfaced drums increasing stepwise in temperature from 100° C. to about 150° C. The average contact time on each drum was about 18 seconds. Next, the fabric moved continuously into an oven held at about 210° C. where the total contact time was about 90 seconds.

EXAMPLE 2

Dyeing cotton broadcloth

Example 1A was repeated except that a 100% mercerized cotton broadcloth was employed, the amount of glycol, Carbitol and boric acid each was increased 50%, and The cotton cloth was dyed a deep, uniform green shade. the maximum temperature was reduced to about 180° C. After the material was scoured in aqueous detergent, then in perchloroethylene at 50° C. for 5 minutes, and dried, as described above, it exhibited a reflectance color value of 4.90.

EXAMPLES 3–5

When Example 2 was repeated, using the dyes of Experiments 1(B), 5 and 10, instead of the dye of Experiment 1(A), the dyed fabrics exhibited reflectance color values of 6.57, 4.30 and 4.57, respectively.

EXAMPLE 6

Printing of 100% cotton fabric

A cotton fabric was padded to about 70% pickup with an aqueous solution containing 200 grams per liter of polyethylene glycol (M.W. 350). The padded fabric was heated at 160° C. for 5 minutes to evaporate water. The fabric was then printed in a pattern with a print paste prepared from:

| | Grams |
|---|---|
| An aqueous green paste (15% active ingredient) containing the dye of Experiment 2 | 10 |
| Purified natural gum ether thickener | 60 |
| Water | 30 |

The printed fabric was heated at 180° C. for 100 seconds, scoured in water containing an ether-alcohol sulfate detergent at about 90° C. for 5 minutes, dried, scoured in tetrachloroethylene at about 50° C. for 5 minutes and dried. The printed areas were strongly dyed.

EXAMPLE 7

Printing of 65/35 "Dacron" polyester/cotton blend fabric

Example 6 was repeated except that a 65/35 "Dacron" polyester/cotton fabric was employed, the glycol was reduced to 125 grams per liter, and the maximum temperature was increased to 200° C. The fastness results of the prints obtained were comparable to those of fabric dyed with the same dye by the procedure of Example 1.

The embodiments of the invention in which an exclusive property or privilege is claimed are defined as follows:

1. Uniformly dyed blue to green water swellable cellulosic fibers, said fibers being fast to washing, drycleaning and sublimation and exhibiting a reflectance color value (S') after scour of at least 2, said dyed fibers being produced by contacting water swellable cellulosic fibers sequentially or concomitantly with water, ethylene glycol or a derivative thereof and, while the fibers are still swollen, the essentially water insoluble, non-vattable anthraquinone dye having the formula

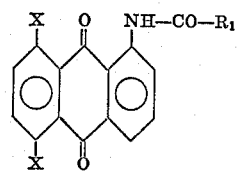

wherein $R_1$ is $C_{1-18}$ alkyl, naphthyl, phenyl or phenyl substituted with $C_{1-4}$ alkyl, $C_{1-4}$ alkoxy, Cl, Br, $CF_3$ or $NO_2$, and X contains 6–18 carbon atoms and is NHalkyl, NHcyclohexyl, N(alkyl)$_2$ or $NHR_2$ wherein $R_2$ is

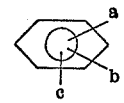

wherein a is H, alkyl or alkoxy, b is H, alkyl, alkoxy, F, Cl, Br, NHCOalkyl or NHCOR, and c is H, alkyl, alkoxy, F, Cl, Br, NHCOalkyl, NHCOR, R, OR, NHR, $CF_3$, CN, $CONH_2$, CONalkyl, CON(alkyl)$_2$, CONHR, CON(alkyl)R, $SO_2NH_2$, $SO_2$NHalkyl, $SO_2$NHR, $SO_2$N(alkyl)$_2$, $SO_2$N(alkyl)R, COalkyl, COR, $CO_2$alkyl, $CO_2$R, $SO_2$alkyl, $SO_2$R or N=NR, wherein R is phenyl or phenyl substituted with alkyl, alkoxy, halogen, $CF_3$ or $NO_2$, provided that the 6-position of $R_2$ is substituted with H, or if the 2-position is substituted with Br or alkyl of greater than two carbon atoms, then H or Br, or if the 2-position is substituted with $C_{1-2}$ alkyl, then H, Br or $C_{1-2}$ alkyl.

2. The fibers of claim 1 wherein the dye is 1-(p-nitrobenzamido)-5,8-bis(p-toluidino)anthraquinone.

3. The fibers of claim 2 wherein the dye contains up to 30% 1-(p-nitrobenzamido)-4,5-8-tris(p-toluidino)anthraquinone.

4. The fibers of claim 1 wherein the dye is 1-(p-nitrobenzamido)-5,8-bis(p-n-butylanilino)anthraquinone.

5. The fibers of claim 1 wherein the dye is 1-(p-nitrobenzamido)-5,8-bis(xylidino)anthraquinone.

6. The fibers of claim 1 wherein the dye is 1-(p-nitrobenzamido)-5,8-bis(cyclohexylamino)anthraquinone.

7. The fibers of claim 1 wherein the dye is 1-benzamido-5,8-bis(cyclohexylamino)anthraquinone.

8. The fibers of claim 1 wherein the fibers are cotton fibers.

9. The fibers of claim 1 admixed or blended with synthetic fibers.

10. The fibers of claim 9 wherein the synthetic fibers are polyester fibers.

References Cited

UNITED STATES PATENTS

| | | | |
|---|---|---|---|
| 2,339,913 | 1/1944 | Hanford | 8—120 |
| 3,473,882 | 10/1969 | Weber et al. | 8—39 |

FOREIGN PATENTS

| | | |
|---|---|---|
| 585,798 | 2/1947 | Great Britain. |
| 1,147,110 | 4/1969 | Great Britain. |
| 1,071,074 | 6/1967 | Great Britain. |
| 1,217,380 | 12/1970 | Great Britain. |

GEORGE F. LESMES, Primary Examiner

P. C. IVES, Assistant Examiner

U.S. Cl. X.R.

8—39, 25, 21B; 260—371, 378, 381